US005617146A

United States Patent [19]
Duffield et al.

[11] Patent Number: 5,617,146
[45] Date of Patent: Apr. 1, 1997

[54] SYSTEM FOR CONTROLLING UPDATES OF EXTENDED DATA SERVICES (EDS) DATA

[75] Inventors: David J. Duffield, Indianapolis; Michael D. Landis, Fishers; Gabriel A. Edde, Indianapolis, all of Ind.

[73] Assignee: Thomson Consumer Electronics, Inc., Indianapolis, Ind.

[21] Appl. No.: 450,955

[22] Filed: May 23, 1995

[30] Foreign Application Priority Data

Jul. 18, 1994 [GB] United Kingdom ............... 9414446

[51] Int. Cl.$^6$ ................................................. H04N 7/08
[52] U.S. Cl. ..................... 348/460; 348/473; 348/466; 348/553
[58] Field of Search .............................. 348/460, 473, 348/478, 563, 569, 553, 725, 474, 465, 463, 468, 466; H04N 7/087, 7/08

[56] References Cited

U.S. PATENT DOCUMENTS

| 4,099,372 | 7/1978 | Beyers, Jr. ...................... 58/85.5 |
| 4,993,003 | 2/1991 | Fechner et al. .................. 368/47 |
| 5,253,061 | 10/1993 | Takahama et al. .............. 348/460 |
| 5,285,496 | 2/1994 | Frank et al. ..................... 380/9 |
| 5,396,558 | 3/1995 | Ishiguro et al. ................. 380/25 |
| 5,428,400 | 6/1995 | Landis et al. ................... 348/569 |
| 5,432,558 | 7/1995 | Kim ............................... 348/460 |
| 5,552,833 | 9/1996 | Henmi et al. ................... 348/460 |

FOREIGN PATENT DOCUMENTS

| 0312798 | 4/1989 | European Pat. Off. ......... H04N 5/76 |
| WO93/22876 | 11/1993 | WIPO ............................. H04N 7/087 |

OTHER PUBLICATIONS

U.S. Patent Application, S.N. 08/121,599 entitled: "Apparatus and Method for Accerss Control" – Attorney Docket No. RCA 87,351.

*Primary Examiner*—Victor R. Kostak
*Attorney, Agent, or Firm*—J. S. Tripoli; Peter M. Emanuel; Robert D. Shedd

[57] ABSTRACT

A system for processing a television signal including a data component, such as extended data services data, includes a decoder for processing the data component to provide data representing time information. A control device responds to the data for modifying time information, e.g., time of day, that is maintained in the system. The time information decoded from the video signal is compared to the time information maintained in the system to determine a time difference. If the time difference is in a predetermined range, the time difference indicates that the time information from the television signal is invalid. The control device responds to the time difference being in the predetermined range by preventing modification of the time information maintained in the system. A user may provide an input via a device such as a remote control to control the manner in which the control device responds to the time difference.

19 Claims, 4 Drawing Sheets

SYSTEM FOR CONTROLLING UPDATES OF EXTENDED DATA SERVICES (EDS) DATA

FIELD OF THE INVENTION

The invention concerns television receivers having circuitry for decoding information, such as closed caption data and extended data services information, that is included in a television signal.

BACKGROUND

In addition to closed captioning information, television signals in the United States may also include Extended Data Services (EDS or XDS) information. EDS information will be available on line 21 of field 2 and includes data encoded in the same format as closed caption data. Thus, the video signal includes both a video information signal component and a data signal component comprising EDS and caption data. EDS and captioning share the bandwidth of line 21 field 2 in a time multiplexed manner. EDS offers a wide range of useful information such as: program title, network name, and current time of day.

The format of EDS data is specified in the EIA-608 standard for line 21 data services for NTSC television signals. EDS data is organized in packets of data bytes. Each packet conveys one piece of information, e.g., the current time of day. Each line 21 of field 2 provides two bytes of EDS data. Particular data byte values occurring in the first byte of any line 21 of field 2 indicate the start of a packet. Each "start" data byte also defines a "class" of information that is included in the packet. For example, a "current" class packet includes information pertaining to the current program that is being viewed. A "miscellaneous" class packet includes various types of information such as time of day information. As an example, a value of 01h in the first data byte in line 21 of field 2 indicates the start of a "current" class packet while a value of 07h indicates the start of a "miscellaneous" class packet.

Although EDS information is potentially useful, EDS data decoded in a receiver may provide incorrect or inappropriate information. EDS data, like closed captioning data, occurs at a data rate that permits recording EDS data on video tape via a conventional video cassette recorder (VCR). Thus, recording a television signal that includes EDS information will also record the EDS data, e.g., EDS time-of-day packets that provide the current time when the packet was recorded. When a tape is viewed at a later time, recorded EDS information can be detected and decoded 0 by the receiver. If the receiver always uses received EDS information for control purposes, the receiver may respond in an undesirable manner to recorded EDS information. For example, if the receiver always uses time information in EDS time-of-day packets to set a clock in the receiver, the clock will be set incorrectly in response to the recorded EDS data because recorded time-of-day information is no longer current. A similar problem exists in regard to EDS packets containing program schedule information because recorded schedule information may be of no value (i.e., the scheduled times have passed).

SUMMARY OF THE INVENTION

The invention resides, in part, in recognizing the described problem and, in part, in providing a solution to the problem. In accordance with a feature of the invention a system for processing a television signal including a video information component and including a data component comprises first means for processing the data component to produce first data representing first temporal information; second means for generating second data representing second temporal information, and for producing a modification of the second data in response to the first data; control means for processing the first and second data to determine a time difference between first and second times represented by the first and second temporal information, respectively; the control means being responsive to a control signal for preventing the modification of the second data if the time difference is in a first range; and the control means preventing the modification of the second data independent of the control signal if the time difference is in a second range exclusive of the first range. The system also includes means responsive to activation by a user for generating the control signal.

In accordance with another aspect of the invention, the control signal generating means includes output means for providing a notification to the user indicating that the time difference is within the first range; and input means responsive to activation by the user during an interval when the notification is being provided to the user for preventing the modification of the second data.

In accordance with another aspect of the invention, the system further comprises a tuner for tuning the television signal from a plurality of television signals, each of which includes a video information component and a data component, and a memory for storing a plurality of codes associated with respective ones of the plurality of television signals. The control means responds to a particular one of the stored plurality of codes associated with the tuned television signal for preventing the modification of the second data if the particular one of the stored plurality of codes exhibits a predetermined value.

In accordance with another aspect of the invention, the first data produced from the data component of the television signal represents a plurality of types of data and the control means prevents modification of the second data associated with the system in response to a particular type of data included in the data component.

In accordance with another aspect of the invention, the stored plurality of codes includes a particular code corresponding to a respective one of the plurality of types of data, and the control means responds to the particular code for preventing the second data from being modified in response to the respective one of the plurality of types of data.

BRIEF DESCRIPTION OF THE DRAWING

The invention may be better understood by referring to the enclosed drawing in which.

DETAILED DESCRIPTION

Figure 1:
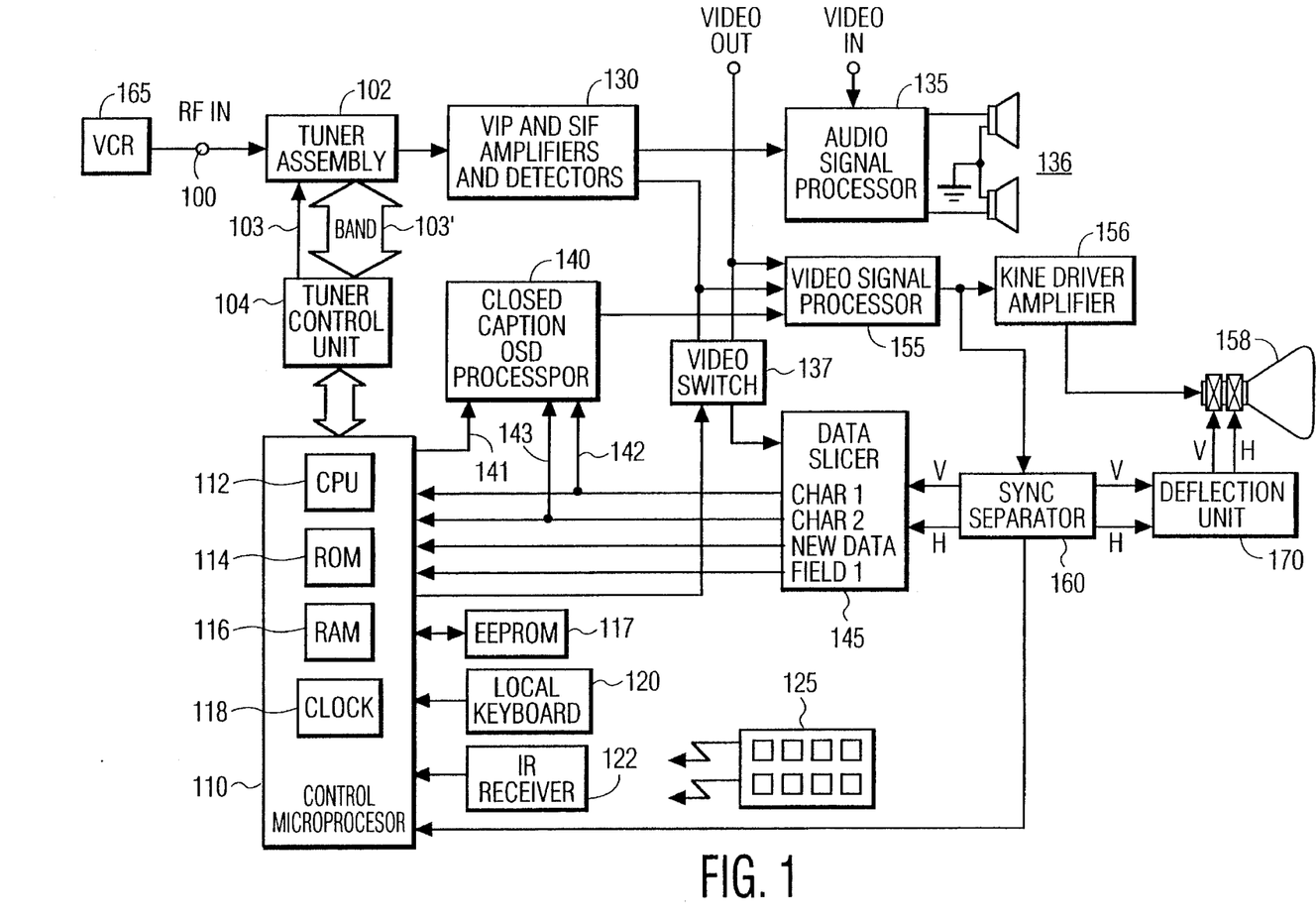
FIG. 1 shows a block diagram of a portion of a television receiver constructed in accordance with principles of the invention.

Referring to FIG. 1, a television receiver includes an RF input terminal 100 that receives a radio frequency (RF) signal from VCR 165 and applies the signal to a tuner assembly 102. Tuner assembly 102 selects and amplifies a particular RF signal, i.e. the VCR signal for the arrangement in FIG. 1, under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer (μC) 110. The terms "microcomputer", "controller", and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116. RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, that it may be desirable to use a suitable form of standby power to preserve its contents when the receiver is turned off.

In response to user-entered control signals from local keyboard 120 and from infrared (IR) receiver 122, microcomputer (or controller) 110 generates a control signal causing tuner control unit 104 to control tuner 102 to select a particular RF signal. Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source. For example, VCR 165 may be connected to the VIDEO IN and AUDIO IN terminals if VCR 165 supplies the appropriate baseband signals.

The first and second baseband video signals (TV) are coupled to a video processor unit 155 (having a selection circuit not shown). Electrically-erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to line driver amplifier 156 for amplification and then applied to the electron guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam. That portion of FIG. 1 described thus far is known, for example, from the RCA CTC-140 color television manufactured by Thomson Consumer Electronics, Inc., Indianapolis, Ind.

An embodiment of the invention will now be described with reference to the remainder of FIG. 1, and to the flowchart in FIG. 2. In FIG. 1, DATA SLICER 145 operates as a decoder for extracting closed caption and EDS data from a data component of a video signal. The video signal processed by DATA SLICER 145 is either a video signal received at a first input from VIF/SIF amplifier and detector unit 130, or a video signal received at a second input from the VIDEO IN terminal. VIDEO SWITCH 137 selects which of the two video signals is coupled to DATA SLICER 145 under control of controller 110. The video signal received from VCR (video cassette recorder) 165 (either via RF IN terminal 100 as shown in FIG. 1 or via VIDEO IN and AUDIO IN terminals) represents a video signal previously recorded on video tape that may include a data component including closed caption and extended data services (EDS) data.

An output of DATA SLICER 145 provides extracted closed-caption data to CLOSED CAPTION OSD PROCESSOR 140 via lines 142 and 143. DATA SLICER 145 also supplies closed-caption status data, such as a NEWDATA signal and a FIELD signal, to controller 110. The FIELD signal indicates whether the received data is in field 1 or field 2 of the video signal. Data that is included in the video signal in accordance with the standard for EDS data will be in line 21 of field 2. Under control of controller 110, via control line 141, CLOSED CAPTION OSD PROCESSOR 140 generates character signals, and applies them to an input of video signal processor 155, for inclusion in the processed video signal. CLOSED CAPTION OSD PROCESSOR 140 Lined DATA SLICER 145 may be included in controller 110.

The system in FIG. 1 also includes a CLOCK feature 118 that is included in and controlled by controller 110. CLOCK 118 represents registers or memory locations where temporal information associated with the system, e.g., current time of day and/or date information, is stored. Controller 110 is responsive to an interrupt at periodic intervals, e.g., a 60 Hz signal derived from the AC. power supply voltage, for incrementing the temporal information that is stored in CLOCK 118. The time may be displayed on a display device such as a 7-segment display (not shown in FIG. 1) that is coupled to controller 110 and mounted on a front panel of the television receiver. Alternatively, the time may be displayed in a portion of the image displayed on CRT 158 by processing the stored time information in OSD processor 140.

The current time (also referred to herein as "local time") that is maintained in CLOCK 118 is checked and modified as required by controller 110. For example, controller 110 can modify the current time in response to time data input by a user (e.g., via IR remote 125). In addition, current time can be modified in response to EDS information that is extracted from a data component of the video signal by a decoder such as data slicer 145. For example, controller 110 checks the stored current time value when EDS time-of-day data is received and changes stored values to the EDS values subject to certain limitations that are illustrated by the flowchart in FIG. 2.

Figure 2:
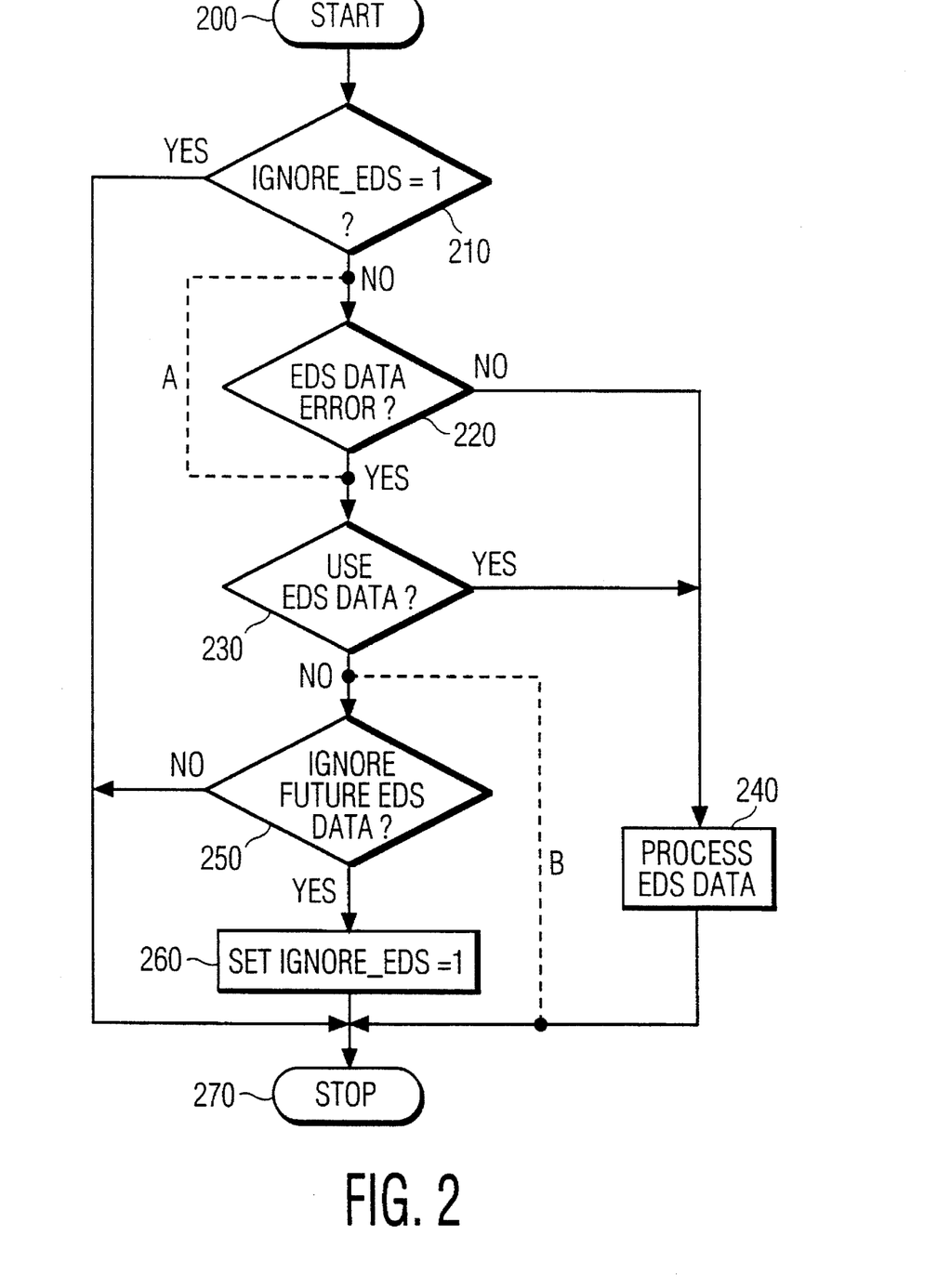
FIG. 2 shows, in flow-chart form, a portion of a control program for the television receiver shown in FIG. 1.

In FIG. 2, an EDS data processing control routine executed by controller 110 is entered at step 200 when, for example, an EDS packet is received. At step 210, the value of a variable IGNORE_EDS is tested. If the variable is at logic 1, EDS information on the present channel will be ignored and the routine is exited at step 270. The value of IGNORE_EDS is determined as described below. If IGNORE_EDS is not logic 1, EDS data in the present signal will be processed further.

At step 220, the EDS data is tested for errors or inappropriate data. For example, EDS data in a time-of-day packet might be tested by comparing the EDS data to the current time stored in CLOCK 118 in FIG. 1. If the EDS time differs significantly, e.g., more than 2 minutes, from the current time, an error may exist. Also, EDS program schedule information could be tested to determine if the scheduled time in the EDS data is reasonable. For example, temporal information in the schedule information could be compared to current time maintained by the system in CLOCK 118 to determine whether the scheduled time is in the future. If no error is detected, the EDS data is processed further at step 240 followed by the routine being exited at step 270. An example of further processing of EDS data is the updating of the current time stored in CLOCK 118 in response to an EDS time-of-day packet.

If an error is detected at step 220, EDS data recorded on video tape may be the source of the error. At step 230, the user is notified that the EDS data is invalid and is asked to provide an input indicating whether or not to use the EDS data. For example, a message, or notification, may be displayed on the television screen. The user may decide to use the EDS data, despite the appearance of an error, in certain instances. For example, an EDS time-of-day packet may not be from video tape and a true discrepancy may exist between the correct time in the EDS time-of-day and the current time stored in CLOCK 118, e.g. following a power failure. If the user decides to use the EDS data, step 230 is followed by further processing of the EDS data at step 240.

Path "A" shown in phantom in FIG. 2 indicates that step 220 is optional. More specifically, the routine in FIG. 2 could be modified by eliminating checking EDS data for errors. The user could be given the opportunity to decide whether or not to use the EDS data for each EDS packet. Alternatively, the error check at step 220 could be limited to specific types of EDS data, e.g., only for EDS time-of-day data, and step 220 would be bypassed for other types of packets. Another approach would be to prompt the user at step 230 in regard to specific types of EDS packets only, e.g., time-of-day packets.

If the user decides at step 230 to not use the EDS data, the user is given the option at step 250 to ignore all future EDS data on the present channel, e.g., channel 4 which is dedicated to providing a television signal from a VCR. If the user chooses not to ignore future EDS data, the routine is exited at step 270 and subsequent EDS data may cause further occurrences of the user query at step 230. If the user chooses to ignore future EDS data, the variable IGNORE_EDS in FIG. 2 is set to logic 1 and a code representing that value is stored in a register or memory, e.g., RAM 116 or EEPROM 117 in FIG. 1. Controller 110 maintains a "map" in memory of values of IGNORE_EDS codes for each channel. The map is updated each time step 260 is executed. Controller 110 accesses the stored map and tests the respective IGNORE_EDS code, i.e. the value corresponding to the current channel, each time step 210 is executed. In this manner, the television receiver automatically "learns" on which channels EDS information is to be ignored. By using the "learned" information, the system need not bother the user with EDS control related messages each time an EDS packet is received.

Once IGNORE_EDS is at logic 1, the user may reset the IGNORE_EDS value for a certain channel to logic 0 to enable the processing of EDS data by activating an EDS control feature. For example, an "EDS enable" entry may be selected in a control menu displayed on the television screen. The menu display is activated, e.g., in response to a particular key being pressed on IR remote 125 in FIG. 1.

As discussed above in regard to step 230, step 250 may be modified to permit the user to selectively ignore only certain EDS data in any channel, e.g., time-of-day packets only. Thus, the user could selectively eliminate only potentially erroneous EDS data in a particular channel. A selective approach could be particularly useful in regard to erroneous or inappropriate EDS data that results from a source other than a VCR. For example, EDS information originating in one time zone while a user is in another time zone or programming that is tape delayed at the station.

Another possible modification of the routine shown in FIG. 2 would be to eliminate or bypass steps 250 and 260 as shown in phantom by path "B" in FIG. 2. If steps 250 and 260 are eliminated, a "NO" result at step 230 results in the routine being exited at step 270. In addition, step 210 and the described stored map of IGNORE_EDS values would be unnecessary. Eliminating the capability to ignore all, or a selected type, of EDS data on a particular channel means that a greater degree of interaction with a user may be required because the message produced at step 230 will be generated each time an erroneous EDS packet is detected. However, increased user interaction eliminates the need for the greater complexity of storing, processing and maintaining the map of IGNORE_EDS values.

Rather than asking a user whether future EDS data should be ignored (step 250 in FIG. 2), a default approach to processing EDS data can be established either via a displayed menu or automatically based on the user's response to the message generated at step 230. For a menu approach, a setup menu, that can be activated by a user, includes an "enable/disable EDS processing" option. When "enable EDS" is selected, EDS data is processed and the message generated at step 230 is displayed as needed. If disabled, EDS data is ignored. A default EDS processing procedure may be established automatically based on a user's response to the first occurrence of the message generated at step 230. If the user chooses to use EDS data, all subsequent EDS data is processed and used without asking the user. If the user chooses to not use EDS data, all future EDS data is ignored automatically without asking the user. A default condition established automatically can be changed, e.g., enabling generation of the message produced at step 230, via a displayed menu. As in the case of the IGNORE_EDS feature described above, a default EDS-handling condition can be global, i.e., all channels and all EDS data, or can apply to particular channels and particular types of EDS data.

Figure 3:
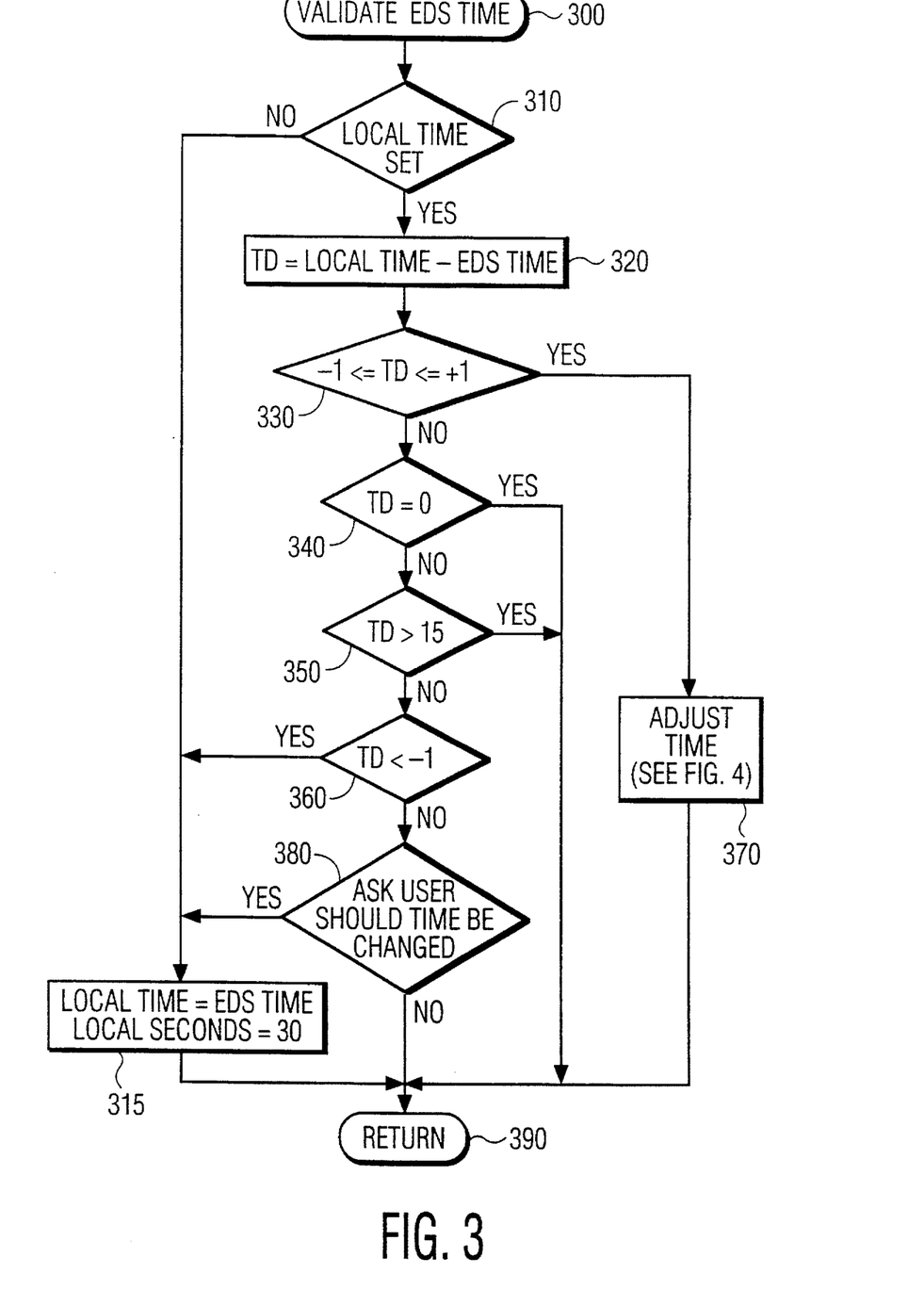
FIG. 3 shows, in flow-chart form, an embodiment of a feature of the control program illustrated in FIG. 2.

FIG. 3 shows, in flowchart form, an exemplary embodiment of a portion of FIG. 2 comprising steps 220, 230 and 240. The embodiment in FIG. 3 processes a specific type of EDS data, namely time-of-day data. EDS time-of-day data may be used to modify a parameter of the system such as the system's "local time", i.e., time maintained by clock 118 in FIG. 1. The routine in FIG. 3 begins at step 300 in response to an EDS time-of-day packet being received. Entering the routine in FIG. 3 at step 300 corresponds to starting execution of step 220 in FIG. 2. Step 300 is followed by step 310 where the time in clock 118 is tested to determine whether clock 118 has been set with a local-time value. For example, step 310 can involve determining whether the system is in the mode of operation that flashes a time value of 12:00 indicating that local time has not been set.

If a local time has not been set, errors in EDS time data relative to local time cannot be determined. Thus, EDS time information, i.e. EDS hours and minutes, is presumed to be valid and is used at step 315 to set the local hours and minutes values maintained by clock 118 in FIG. 1. At step 315, the "seconds" portion of the local time-of-day value is set to 30 seconds because EDS time-of-day information does not necessarily define seconds. Time-of-day data provided by EDS does include a "seconds" bit. However, that bit may be, but is not necessarily, set only when EDS time information is sent at the "top" of the minute, i.e., zero seconds. At any other time, the bit is not set and the seconds value is known only to be non-zero. Therefore, the seconds value is set to a predetermined value such as 30 seconds at step 315. The routine in FIG. 3 is exited at step 390 following step 315.

If local time is set when step 310 is executed, operation continues at step 320 where a time difference TD between EDS time and local time is calculated. Because EDS time information does not necessarily includes seconds information, value TD represents a time difference in hours and minutes only. More specifically, value TD is determined by subtracting EDS hours and minutes values from local hours and minutes values maintained by clock 118. Step 320 is followed by step 330 where value TD is tested to determine whether value TD is equal to either +1 minute or −1 minute. If the result is "YES", EDS time is close to local time, but local time may be incorrect and may require correction. Therefore, operation continues at step 370 where EDS time data is processed further and may be used to correct local time.

Figure 4:
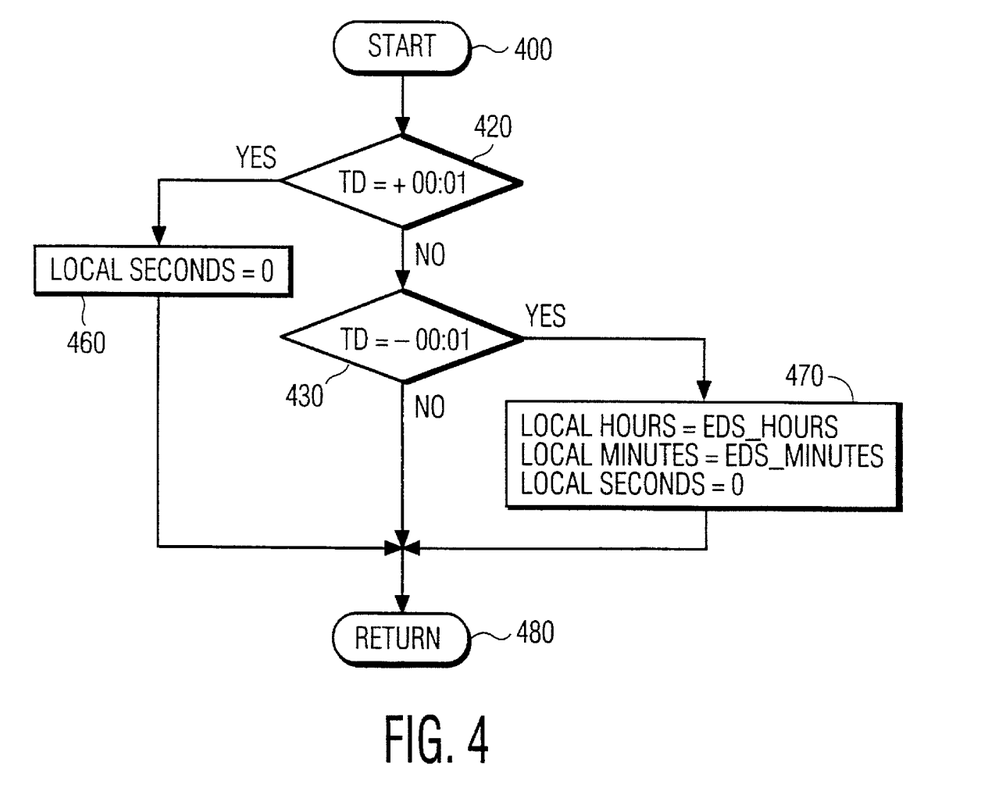
FIG. 4 shows, in flow-chart form, an embodiment of a feature shown in FIG. 3.

An implementation of step 370 is illustrated in FIG. 4. After entering the routine shown in FIG. 4 at step 400, time difference value TD (calculated at step 320 in FIG. 3) is evaluated beginning at step 420. If value TD is equal to +1 minute, local time exceeds EDS time by time amounts of from 1 second to 1 minute and 59 seconds. In this case, changing the local minutes value to equal the EDS minutes value could increase an existing error. For example, if local time is 12:05:01 and EDS time is 12:04 and the correct seconds value is 59 seconds (12:04:59), the actual time error is 2 seconds and value TD is +1. If local minutes is changed from 5 to the EDS value of 4, the error increases to 58 seconds because local time becomes 12:04:01 while the correct time is the EDS time of 12:04 plus 59 seconds. To avoid increasing the error, the local seconds value is set to a predetermined value of 0 (step 460) for a TD value of +1. Changing only the local seconds value has the effect of changing local time in a direction that decreases the error, e.g., 12:05:01 becomes 12:05:00 reducing the error to 1 second when the correct time is 12:04:59. Following step 460, the routine is exited at step 480.

If the time difference is not equal to +1 minute, another evaluation of time difference TD occurs at step 430 to determine if value TD is equal to −1 minute. If so, local time is less than EDS time by time amounts ranging from −1 second to −1 minute and 59 seconds. In this case, if only the seconds field was changed as was done at step 460, the time error increases rather than decreases. For example, changing a local time of 12:04:59 to 12:04:00 when the correct/EDS time is 12:05:01 increases the error from −2 seconds to −61 seconds. Thus, local hours and minutes are set to EDS hours and minutes and the local seconds value is set to 0 at step 470. This operation decreases the error. For example, changing local time of 12:04:59 to 12:05:00 when correct/EDS time is 12:05:01 decreases the error from −2 seconds to −1 second. If the time difference is not −1 minute at step 430, the routine is exited at step 480. Adjusting local time in response to EDS data as shown in steps 315 and 370 in FIG. 3 and in FIG. 4 is described in more detail in commonly assigned and co-pending U.S. patent application Ser. No. 08/362284 filed on Dec. 22, 1994 for Michael D. Landis et al. and incorporated herein by reference.

Returning to FIG. 3, a "NO" result at step 330 causes value TD to be tested at step 340 to determine whether value TD is equal to 0. If "YES", local time is correct and need not be changed. Thus, the routine is exited at step 390. If the result at step 340 is "NO", value TD is tested further at step 350 to determine whether the time difference is in a first range defined as a time difference greater than 15 minutes. If "YES", the EDS time value is presumed to come from a recorded source and is ignored by exiting the routine at step 390.

A "NO" result at step 350 causes value TD to be compared to the value −1 at step 360. If value TD is less than −1, i.e., "YES" at step 360, EDS time is ahead of local time by more than 1 minute and is not from a recorded source. Thus, local time is incorrect and local hours and minutes are set to the EDS values at step 315. As described above, local seconds are set to 30 seconds at step 315. Following step 315, the routine is exited at step 390. A "NO" result at step 360 indicates that the time difference is in a second range defined as a time difference greater than 2 minutes but less than 15 minutes.

Although a value of TD between +2 and +15 minutes could indicate that the EDS data is from a recorded source, it is unlikely because the difference is a relatively small value. That is, it is unlikely that a user would playback EDS data within 15 minutes of recording the data. The uncertainty as to the source of the EDS data is resolved at step 380 by providing a notification to a user, e.g., a displayed message (corresponds to step 230 in FIG. 2), indicating that the time difference is in the range of +2 to +15 minutes, and asking the user whether or not local time should be corrected. If the user responds affirmatively, CPU 112 in FIG. 1 produces a modification of local time in clock 118 at step 315 by setting local time to EDS time followed by the routine being exited at step 390. If the user responds negatively at step 380, the routine is exited directly at step 390. The path from step 380 to step 390 in FIG. 3 corresponds to path "B" shown in phantom in FIG. 2.

Although the preceding description of the invention is primarily in the context of time-related EDS data, the invention may also be useful in regard to other types of EDS data that may cause modifications of other parameters. For example, EDS data may also include data packets that provide the name of the television network associated with the signal source. A television may automatically receive EDS network name information and "label" (or translate the network name into a "logo") channels without the user's effort. Thus, a user who wishes to watch a particular network but does not know the channel number can select the channel by choosing the network name from a menu. However, a VCR also includes a tuner and may selectively couple any network to a single channel, e.g., channel 4, for coupling the VCR to a television set. Thus, using network name information from recorded EDS data to establish a label for the dedicated VCR channel would result in a continuously changing label. In addition, a user might also want to use non-standard network names, use a "label" instead of a "logo", or use the label "VCR" for the VCR channel rather than using the logo for whatever the VCR was tuning. By "learning" to ignore certain EDS data on certain channels, a user's preferred data, e.g., particular labels or logos, would not be corrupted. In addition, EDS data could be ignored for purposes of modifying a list of network labels, but the television could continue to process EDS network name data to "learn" what network each of the local channels carried.

The invention is also applicable to data that is similar to EDS data, but does not comply with the EIA-608 standard. Specifically, data may be included in horizontal line intervals other than line 21 of field 2, e.g., line 16. In addition, data may be included in more than one line interval per field or frame of video information. For data that occurs in a line interval other than line 21 or in multiple line intervals, the embodiment described can be modified to detect the appropriate line intervals. For example, data slicer 145 in FIG. 1 would count horizontal line intervals and extract data from the desired line intervals as the line intervals occur.

The invention is also applicable to digital television signals. As described above, auxiliary data such as EDS information may be included in specific horizontal line intervals of analog television signals, e.g., an NTSC signal. However, digital signals may include data organized in packets of data, i.e., a "packetized" signal, rather than by horizontal line intervals. Each packet provides data pertaining to a particular "stream" of information, e.g., a particular channel, and a particular type of data, e.g., control data, video data, audio data or EDS-type data. Multiple packets may be necessary to provide all information needed to produce a horizontal line of a displayed image. Thus, data such as EDS information is included in one or more packets rather than one or more horizontal line intervals such as in analog television signals. An example of a digital television system using a packetized digital signal is the DSS® (Digital Satellite System) television system manufactured by Thomson Consumer Electronics, Inc., Indianapolis, Ind. Each data packet included in the DSS® signal includes a "header" portion that identifies the type of information in the packet and includes a "payload" portion that is the packet data. The header indicates, for example, that the payload includes EDS-type data associated with channel 3.

These and other modifications are intended to be within the scope of the following claims.

We claim:

1. A system for processing a television signal including a video information component and including a data component, said system comprising:

first means for processing said data component to produce first data representing first temporal information;

second means for generating second data representing second temporal information, and for producing a modification of said second data in response to said first data;

control means for processing said first and second data to determine a time difference between first and second times represented by said first and second temporal information, respectively, being responsive to a control signal for preventing said modification of said second data if said time difference is in a first range, and for preventing said modification of said second data independent of said control signal if said time difference is in a second range exclusive of said first range; and means for generating said control signal.

2. The system of claim 1 wherein said time difference being in one of said first and second ranges indicates said second time is later than said first time.

3. The system of claim 1 wherein said time difference being in said second range indicates said second time is later than said first time by an amount greater than if said time difference is in said first range.

4. The system of claim 3 wherein said means for generating said control signal comprises:

output means for providing a notification to a user indicating that said time difference is in said first range; and input means responsive to activation by a user during an interval when said notification is being provided to said user for generating said control signal.

5. The system of claim 4 further comprising memory means for storing a code; said control means being responsive to a predetermined value of said stored code for preventing said second means from producing said modification.

6. The system of claim 5 wherein said stored code is set to said predetermined value in response to said activation by said user.

7. The system of claim 6 further comprising means for tuning said television signal from a plurality of television signals; said memory means storing a plurality of codes associated with respective ones of said plurality of television signals; said control means being responsive to a respective one of said stored plurality of codes for preventing said second means from producing said modification if said respective one of said stored plurality of codes exhibits said predetermined value.

8. The system of claim 3 wherein said first range of values being values from 2 minutes to 15 minutes; and said second range of values being values greater than 15 minutes.

9. A system for processing a television signal including a video information component and including a data component, said system comprising:

first means for processing said data component to produce first temporal information;

second means for modifying second temporal information associated with said system in response to said first temporal information, and for determining a time difference between a time represented by said first temporal information and that represented by said second temporal information;

output means for providing a notification to a user indicating that said time difference is within a first range; and input means responsive to activation by a user during an interval when said notification is being provided to said user for preventing modification of said second temporal information by said second means in response to said first temporal information.

10. The system of claim 9 wherein said time difference being in said first range indicates that said second temporal information represents a time later than that represented by said first temporal information.

11. The system of claim 10 wherein said second means modifying said second temporal information independent of activation of said input means by said user if said time difference is in a second range exclusive of said first range.

12. The system of claim 11 wherein said time difference being in said second range indicates that said second temporal information represents a time later than that represented by said first temporal information; and said second range including values of said time difference greater than values of said time difference included in said first range.

13. The system of claim 12 wherein said notification being a video image displayed on a display device and said output means comprising on-screen-display means for generating a signal representing said video image.

14. The system of claim 13 wherein said first temporal information comprising a first time of day; and said second temporal information comprising a second time of day maintained by said system.

15. The system of claim 14 wherein said first temporal information further comprising a first date; and said second temporal information further comprising a second date maintained by said system.

16. A system for processing a television signal including a video information component and a data component including a plurality of types of data, said system comprising:

a memory for storing a plurality of codes associated with respective ones of said plurality of types of data;

a decoder for decoding said data component of said input television signal to produce data;

a controller for producing a modification of a parameter of said system in response to a particular one of said plurality of types of data, and being responsive to one of said stored plurality of codes associated with said particular one of said plurality of types of data for preventing said modification if said one of said stored plurality of codes exhibits a predetermined value; and means responsive to an input by a user for setting said one of said stored plurality of codes to said predetermined value.

17. The system of claim 16 wherein said means responsive to an input by a user comprises output means for providing a notification to a user indicating that said data component includes said particular type of data; and input means responsive to activation by a user during an interval when said notification is being provided to said user for setting said one of said stored plurality of codes to said predetermined value.

18. The system of claim 17 wherein said parameter comprises a time of day.

19. The system of claim 17 wherein said parameter comprises a network name.

* * * * *